United States Patent

[11] 3,616,926

[72] Inventor Eric S. Lichtenstein
 24 East 93rd St., New York, N.Y. 10028
[21] Appl. No. 10,967
[22] Filed Feb. 12, 1970
[45] Patented Nov. 2, 1971

[54] TUBULAR DIALYSIS FILTRATION APPARATUS
 12 Claims, 6 Drawing Figs.
[52] U.S. Cl. .................................................. 210/321,
 210/352
[51] Int. Cl. .................................................. B01d 31/00,
 B01d 13/00
[50] Field of Search ....................................... 210/22, 23,
 321, 351, 352, 485, 487, 323

[56] References Cited
UNITED STATES PATENTS
3,442,388  5/1969  Pall ............................. 210/321

*Primary Examiner*—Frank A. Spear, Jr.
*Attorney*—Blum, Moscovitz, Friedman & Kaplan ABSTRACT: A dialysis apparatus to be used for a device such as an artificial kidney. The apparatus is primarily formed by a single semipermeable membrane supported, as by wires, in such a way that it has a configuration defining two groups of tubes which can only communicate with each other through the membrane itself. Thus, the single membrane is supported by the wires and suitable tubular extensions to define two groups of tubes separated from each other only by the membrane itself so that the fluids to be treated can be subjected to diffusion, or osmosis through the membrane from one of the groups of tubes to the other of the groups of tubes while permitting collection of separated components to take place.

PATENTED NOV 2 1971

INVENTOR
ERIC S. LICHTENSTEIN

BY
Blum, Moscovitz, Friedman & Kaplan
ATTORNEYS

TUBULAR DIALYSIS FILTRATION APPARATUS

BACKGROUND OF THE INVENTION

The invention relates to dialysis apparatus.

Thus, the invention relates to an apparatus which may be used, for example, as an artificial kidney, as an artificial lung, or in any device requiring removal of substances in solution by diffusion through a membrane. The device thus may have not only uses in connection with functions of the human body but also industrial uses.

Known devices of this general type are relatively voluminous, complex, and expensive. For example, it is known to support sections of semipermeable membrane on frames which have a predetermined thickness and which are stacked in such a way as to form chambers, and with this cumbersome structure it is in addition necessary to provide for proper flow of fluids through these chambers so that the separation of the substances in solution can take place in the required manner.

SUMMARY OF THE INVENTION

It is a primary object of the present invention to provide a dialysis apparatus which is exceedingly simple and inexpensive while at the same time carrying out the dialysis operations in an extremely effective manner.

Another object of the invention is to provide a dialysis apparatus which is of extremely lightweight and which provides for a maximum area of semipermeable membrane exposed to the fluid which is to be treated in a minimum space.

Also, it is another object of the invention to provide a structure of this type which can be manufactured very simply with a small number of components.

Furthermore, it is another object of the invention to provide an apparatus which lends itself to easy modification so that it is readily adapted for different uses.

According to the invention, the dialysis apparatus includes a single semipermeable membrane of substantially flexible and elastic sheet material. A support means supports the membrane so that it has the configuration of one group of tubes surrounding and situated between a second group of tubes, with the latter group of tubes separated from the first group only by the wall thickness of the single membrane itself. These groups of tubes can communicate with a pair of fluid-directing means which bring about the flow of suitable fluids through the groups of tubes to carry out the required treatments.

BRIEF DESCRIPTION OF DRAWINGS

The invention is illustrated by way of example in the accompanying drawings which form part of this application and in which.

DESCRIPTION OF PREFERRED EMBODIMENTS

Figure 3:
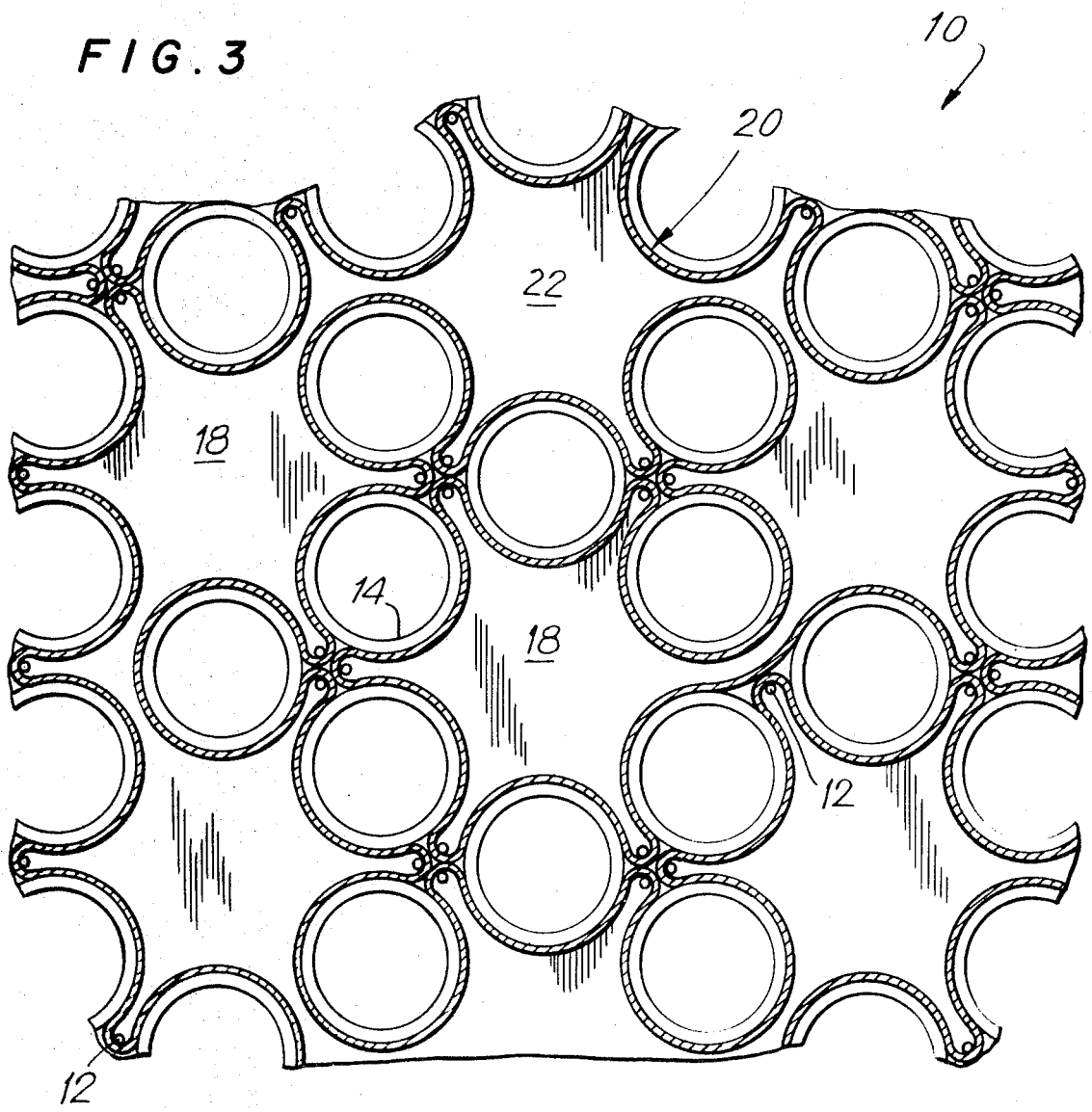
FIG. 3 is a sectional elevation taken along line 3—3 of FIG. 1 in the direction of the arrows and showing at an enlarges scale the manner in which the single membrane is supported to form the two sets of tubes of the apparatus of the invention.

According to one of the important features of the present invention, the dialysis apparatus is basically formed from a single semipermeable membrane 10, part of which is shown in cross section FIG. 3. This membrane 10 takes the form of a sheet which may initially be of rectangular configuration and which is made of a functionally active material such as, for example, cellophane used in the construction of dialysis equipment. Other semipermeable membranes may be used, however. The sheet material which forms the semipermeable membrane is flexible and may be elastic to a controlled degree.

Figure 4:
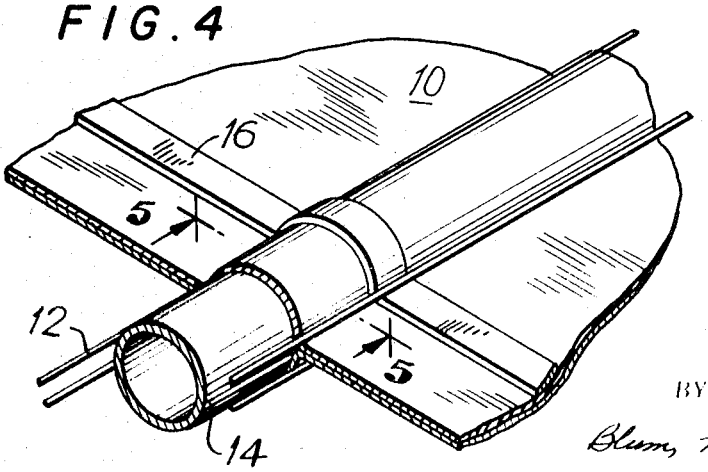
FIG. 4 is a fragmentary perspective illustration showing how the tubes are formed.
Figure 5:
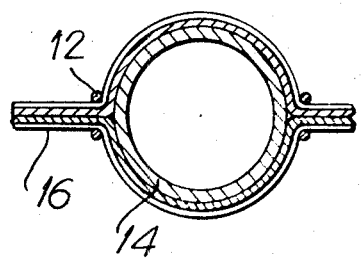
FIG. 5 is a transverse section taken along line 5—5 of FIG. 4 in the direction of the arrows and showing at an enlarged scale the manner in which the membrane is supported to form tubes.

According to the invention, the single membrane 10 of the apparatus of the invention is supported by a support means which gives the membrane the configuration shown most clearly in FIG. 3 in cross section. For this purpose the support means includes a plurality of elongated wires 12 and tubular extensions 14. As may be seen from FIG. 4, a pair of wires 12 are situated at one side of the extension 14 and a second pair at the other side thereof, these wires shaping web portions of the membrane 10 around an inner end of the tubular extension 14 so that the web portions which surround the extension 14 are of substantially semicircular configuration in cross section and engage each other longitudinally along the extension 14 where the wires press the web portions against each other. Beyond the extension 14 the wires continue to press the membrane web portions against each other to form an elongated tube thereof. The membrane may have a suitable coating of sealing material situated at the surfaces thereof which engage and extend around the tubular extensions 14. In addition, elongated sealing strips 16 are situated along the edge regions of the membrane to receive the wire and to form seals at any gaps between membrane portions. These sealing strips 16 may be composed of a moderately compressible material, preferably a plastic compound capable of setting into a hard support and seal. Initially it is in the form of a soft tape extending along the outer side edge regions of the membrane sheet, and the wire supports 12 are held against the membrane in their proper positions by the tape 16. As was pointed out above, the surface of the membrane opposite to that which carries the strips 16 may have an adhesive coating applied thereto. With this construction, tubes which are formed in the manner described below are automatically sealed and the strips 16 harden to form an integral part of terminal manifolds which serve to space, support and separate the tubes. Instead of extensions 14 it is possible to use an appropriate epoxy adhesive integrally bonded to the membrane and initially molded around a cylindrical body which is removed after epoxy sets, so as to form in this way tubes which provide the extensions 14.

As may be seen from FIG. 3, the sheet of membrane 10 may start, for example, at the lower left region of FIG. 3 to form the substantially semicircular portions around the wires 12, as determined by the configuration of the tubular extensions 14. The membrane 10 progresses around in-and-out in the manner shown in FIG. 3 so as to surround these series of extensions 14 with the membrane portions forming substantially semicircular channels surrounding the extensions 14 in the manner shown most clearly in FIG. 3. As is apparent from FIG. 3 as well as FIG. 2, the several extensions 14 are arranged with six of the tubular extensions 14 defining a hollow tubular space surrounded by the six extensions 14. Thus it will be seen that hollow elongated spaces 18 are defined by the series of tubular extensions 14 with each tubular extension 14 situated between a pair of the hollow spaces 18. The wires 12 serve to shape the membrane 10 around the extensions 14 in the manner shown most clearly in FIG. 3, so that the hollow spaces 18 form elongated tubes which have six sides, each of which is of a substantially semicircular configuration in cross section. In this way the single membrane can be arranged as indicated in FIG. 3 to define one group of tubes 20, six of which surround and define each of the tubes 18 of the second group, the group of tubes 18 being separated from the group of tubes 20 only by the single wall thickness of single membrane 10.

Figure 1:
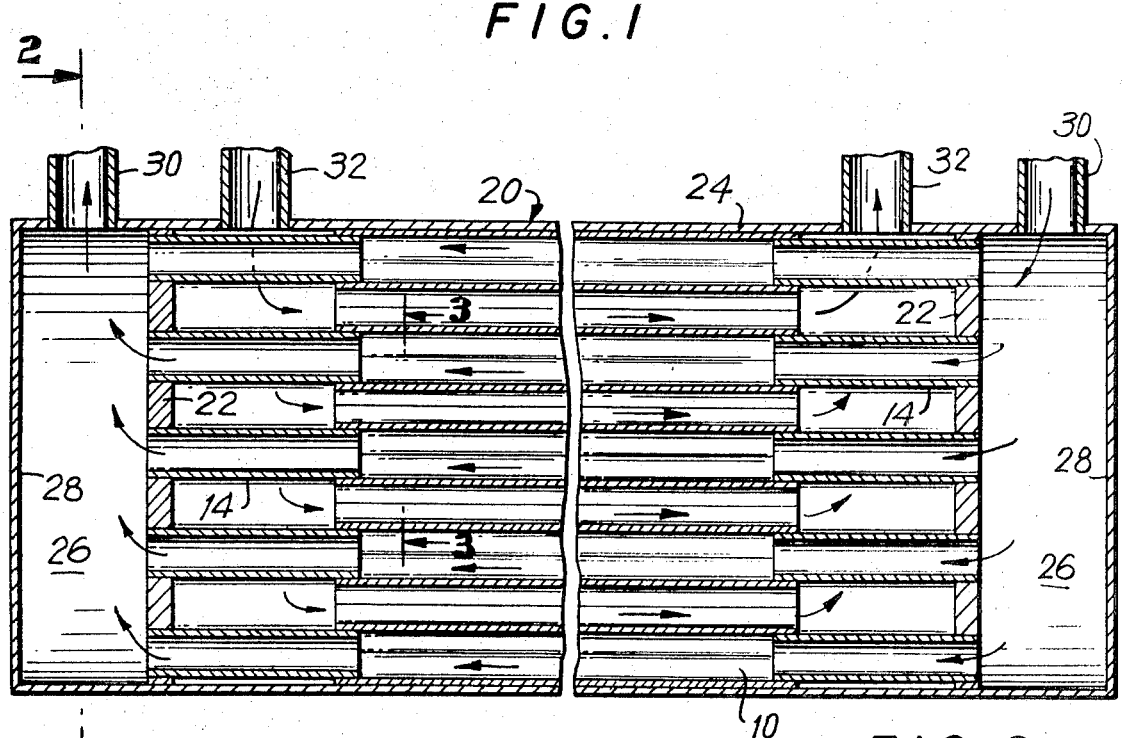
FIG. 1 is a longitudinal sectional elevation schematically illustrating one possible apparatus according to the invention in a fragmentary manner.
Figure 2:
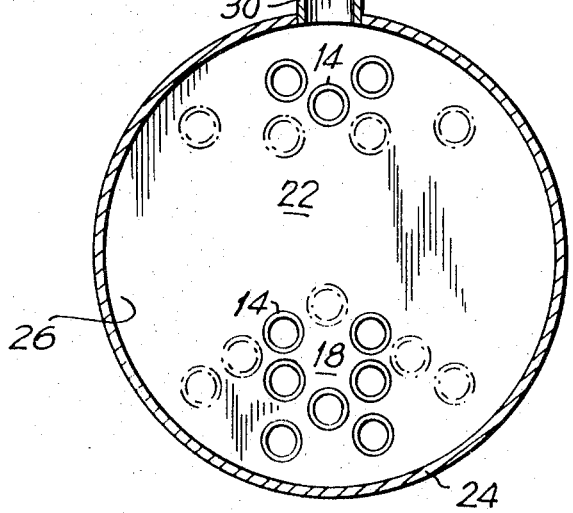
FIG. 2 is a transverse section of the structure of FIG. 1 taken along line 2—2 of FIG. 1 in the direction of the arrow.

Referring now to FIG. 1, it will be seen that the several tubular extensions 14 have their inner ends joined to the side edge regions of the single membrane 10 in the manner described above and have outer ends distant therefrom. These outer ends are fluidtightly received in openings of a pair of circular walls 22, one of which is shown in FIG. 2. These walls 22 are fluidtightly supported in an elongated cylindrical casing 24 of any suitable plastic or metal, the casing 24 extends beyond the walls 22 so as to form a pair of headers or manifolds 26. The casing 24 is closed by a pair of end walls 28. A pair of tubes 30 respectively communicate with the headers 26 while a pair of additional tubes 32 respectively communicate with the space within the casing 24 between the walls 22 and the membrane 10.

The headers 26 together with the conduits 30 and the inner surfaces of the tubular extensions 14 define one fluid-directing means for directing one fluid through the group of smaller tubes 20 defined by the membrane 10. The conduits 32 together with the inner surfaces of the walls 22 and the outer surfaces of the extensions 14 and the portions of the casing 24 surrounding the latter form a second fluid-directing means serving to direct fluid through the other group of tubes 18 defined by the membrane 10. In this way it is possible to direct different fluids through the groups of tubes 18 and 20 to bring about the required operations, and as is indicated by the arrows in FIG. 1, it is possible to direct these fluids in opposite directions, bringing about the advantages of countercurrent flow between the different fluids on the opposite surfaces of the membrane 10.

Once an apparatus of the above general type is formed, the sealing strips set to maintain the configuration of the structure. The wires can be additionally supported either by being bound in any way to the exterior surfaces of the tubes 14 or by having their ends embedded in the walls 22 or 28. The seals will engage the inner surface of the outer casing 24 to form a fluidtight mounting of the membrane therein. When the apparatus is used for dialysis, for example, dialysate will enter one of the headers 26 to flow, for example, from the right header through the tubes 20 and interiors of the extensions 14 to the left header 26 to FIG. 1, while blood is introduced through the left conduit 32 in order to flow to the right, in countercurrent to the dialysate, to discharge out through the right conduit 32 after passing through the group of tubes 18.

The basic unit described above can be of any desired size and can be connected in series or in parallel, with or without pumping, and can be operated at various pressures and with various membranes, depending upon the desired functions.

The apparatus may also be modified to operate for filtration instead of dialysis. The membrane clearing capacity of laminar flow skimming can be augmented by providing for either pulsitile flow or alternate synchronized internal pumping.

Figure 6:
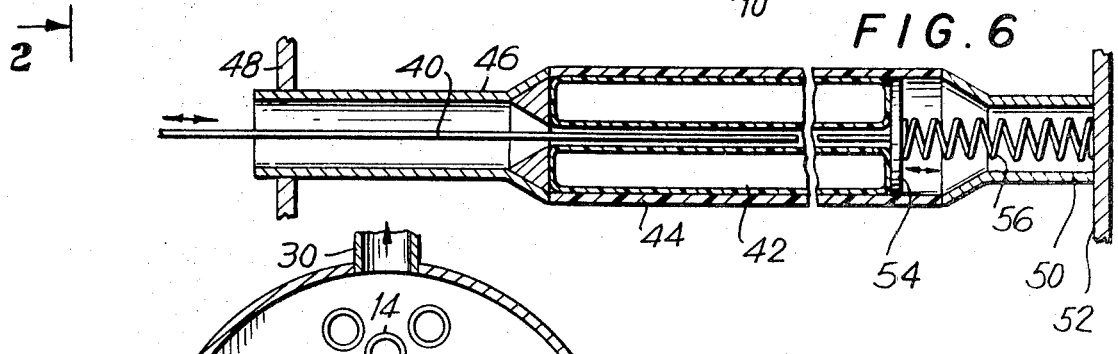
FIG. 6 is a schematic, fragmentary, partly sectional, elevation of a further feature of the invention.

For this purpose as indicated in FIG. 6, a number of wire supports are replaced by a supporting structure consisting of an internal wire 40 surrounded by an elastic flexible tube 42 containing, for example, a highly viscous and slightly compressible compound such as a suitable silicon compound. Thus, the tube 42 is of a toroidal configuration and circumferentially surrounds the wire 40.

Each of the tubes 42, only one of which is shown in FIG. 6 for the sake of clarity, is situated within an elastic outer tubular wall 44 which may form part of the single membrane of the invention. This wall 44 extends from one end of a sealed outer casing 46 fixed to an extending through the left wall 48 shown in FIG. 6. At its opposite end the outer wall 44 is connected with and extends from a sealed tubular outer casing member 50 which is fixed to but does not extend through an opposed external wall 52.

The elongated wire 40 may be longitudinally reciprocated by any suitable structure connected to its left end, as viewed in FIG. 6. At its right end, the wire 40 is fixed with a moving plunger 54 which engages the right end of the toroidal tubular enclosure 42. This plunger 54 in turn is acted upon by the left end of a coil spring 56 whose right end engages the wall 52, this spring being housed within the outer casing member 50.

Thus, the tubes 42 may be longitudinally deformed, parallel to the internal wire supports 40, by exterior application of mechanical or hydraulic pressure on the sealed tube. The deformation of the sealed tube 42 can be rhythmic and synchronized, by controls acting on the wire 40, to produce an expansile force perpendicular to the longitudinal axis of the supporting wire, with resultant shortening of the long axis of the sealed tube 42 and expansion of its diameter. In this way it is possible to impart alternating compression and relaxation pressures to adjacent membrane tubes. Thus, as may be seen from FIG. 6, tension on the wire 40 activated the plunger 54 against the force of the return spring 56. The plunger compresses the sealed liquid along the longitudinal axis of the unit, forcing lateral expansion of the elastic outer walls which in turn imparts a pumping force to adjacent structures. Release of the wire tension allows activation of the return spring and releases lateral pressure. The entire unit is enclosed in a seal-jacket or outer casing, allowing fluidtight passage of moving components through the headers or manifolds part of which are formed by the wall 48. In this way it is possible to maintain the integral construction without resorting to moving units such as washers.

With a unit of appropriate size the tube pumping could be synchronized to provide augmentation of pressure-enhancing blood flow, with the the aid of appropriate valve configurations and in an implanted unit such power might easily be derived from movements of appropriate muscles, or with appropriate power, from implanted or external power sources.

The pumping tube itself, in a modified use, may be developed into a cardiac prosthesis by arrangement of a series of these units around the heart, either within or extrapericardially, with fixation to slightly elastic collars at the major vessels, and to a common base containing the pump power mechanism.

As was indicated above, while the invention has multiple biomechanical applications, it also is easily adapted to nonbiological uses.

What is claimed is:

1. In a dialysis apparatus, a single semipermeable membrane of flexible and somewhat elastic sheet material, support means supporting said membrane in a configuration defining one group of tubes surrounding and situated between another group of tubes with the latter group of tubes separated from said one group of tubes only by a single wall thickness of said membrane, and a pair of fluid-directing means respectively communicating with said groups of tubes for directing fluids therethrough.

2. The combination of claim 1 and wherein said support means includes for each of said tubes of said one group a pair of wires extending along one side of each tube of said one group and a pair of wires extending along the other side of each tube of said one group, said pairs of wires of each tube of said one group holding web portions of said membrane against each other to define an elongated tube.

3. The combination of claim 2 and wherein sealing strips are situated along the exterior of each of said tubes of said one group, extending along said membrane.

4. The combination of claim 2 and wherein that one of said fluid-directing means which directs fluid through said one group of tubes includes a plurality of tubular extensions having inner ends around which edge regions of said membrane extend and outer ends distant from said membrane to form extensions of said tubes of said one group.

5. The combination of claim 4 and wherein said one fluid-directing means includes a pair of headers communicating fluidtightly with the outer ends of said tubular extensions for directing fluid therethrough and through said one group of tubes situated therebetween.

6. The combination of claim 5 and wherein the other of said fluid-directing means is defined by the exterior surfaces of said tubular extensions between said headers and said membrane so that at the exterior of said tubular extensions the other of said fluid-directing means directs fluid through the other of said group of tubes.

7. The combination of claim 6 and wherein each of said t one group of tubes defined by said membrane gives to each of the second group of tubes the cross-sectional configuration of a multiple-sided figure, each side of which has substantially the configuration of a semicircle extending halfway around each tube of said one group.

8. The combination of claim 7 and wherein each of said tubes of said second group has six sides of said substantially semicircular cross-sectional configuration.

9. The combination of claim 8 and wherein each of said tubes of said one group situated inwardly from an outer region of said membrane is located between a pair of said tubes of said other group with the part of the membrane which forms approximately one-half of each of said tubes of said one group forming part of a tube of said other group, and the other part of said membrane which forms the other part of said tube of said one group forming part of another of said tubes of said other group.

10. The combination of claim 9 and wherein an outer casing surrounds and encloses said membrane and has portions surrounding said tubular extensions and defining parts of said headers so as to form part of both of said fluid-directing means.

11. The combination of claim 1 and wherein a pump means is situated in at least some of said tubes for increasing and decreasing the diameters thereof to create a pumping action.

12. The combination of claim 11 and wherein said pump means includes in each of a plurality of tubes an annular sealed flexible enclosure containing a fluid, an elongated wire surrounded by said enclosure, a plunger at one end of said wire engaging one end of said enclosure, and a return spring engaging said plunger at the side thereof opposite from said wire, so that in response to controls acting longitudinally on said wire said enclosure can be longitudinally shortened and lengthened while being radially enlarged and reduced, with said return spring returning said enclosure to a given rest position, to bring about the pumping action.